(12) United States Patent
Dryer et al.

(10) Patent No.: US 11,954,753 B2
(45) Date of Patent: Apr. 9, 2024

(54) RAILROAD OPERATIONS IMAGE DETECTION AND IDENTIFICATION SYSTEM AND METHOD THEREFOR

(71) Applicant: BNSF Railway Company, Fort Worth, TX (US)

(72) Inventors: Nicholas Dryer, North Barrington, IL (US); Zachery Bettis, Fort Worth, TX (US); Bryan Gabric, Weatherford, TX (US); Michael Ibanez, McAllen, TX (US); Yasha Hajizeinalibiouki, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/898,194

(22) Filed: Aug. 29, 2022

(65) Prior Publication Data

US 2024/0070598 A1 Feb. 29, 2024

(51) Int. Cl.
*G06V 20/17* (2022.01)
*B64C 39/02* (2023.01)
*G06Q 10/0631* (2023.01)
*G06Q 50/28* (2012.01)
*G06V 20/10* (2022.01)
*B64U 101/00* (2023.01)

(52) U.S. Cl.
CPC ........... *G06Q 50/28* (2013.01); *B64C 39/024* (2013.01); *G06Q 10/06315* (2013.01); *G06V 20/17* (2022.01); *G06V 20/176* (2022.01); *B64U 2101/00* (2023.01)

(58) Field of Classification Search
CPC ............ G06Q 50/28; G06Q 10/06315; G06V 20/17; G06V 20/176; B64C 39/024; B64U 2101/10
See application file for complete search history.

(56) References Cited

U.S. PATENT DOCUMENTS

| | | |
|---|---|---|
| 7,805,227 B2 | 9/2010 | Welles et al. |
| 9,944,390 B2 | 4/2018 | Ljubuncic et al. |
| 10,187,616 B2 | 1/2019 | Shondel |
| 10,597,054 B2 | 3/2020 | Arndt et al. |

(Continued)

OTHER PUBLICATIONS

Wu et al., Deep Learning for UAV-based Object Detection and Tracking: A Survey, Oct. 25, 2021.

*Primary Examiner* — Syed Haider
(74) *Attorney, Agent, or Firm* — Whitaker Chalk Swindle & Schwartz, PLLC; Enrique Sanchez, Jr.; Juan Vasquez

(57) ABSTRACT

Methods and systems for providing automated asset management are provided. In embodiments, an asset data collector is configured to automatically collect asset data associated with assets in an intermodal facility according to a mission plan. An automated data collection configurator is configured to configure the mission plan based on one or more parameters and to instantiate the asset data collector to initiate collection of the asset data according to the mission plan. An automated asset data analyzer is configured to identify data in which one or more assets appear, to identify the one or more assets detected in the set of data, to inspect, based on the set of data in which the one or more assets are detected, the one or more assets to determine a condition of the one or more assets, and to output the condition of the one or more assets.

18 Claims, 4 Drawing Sheets

(56) References Cited

U.S. PATENT DOCUMENTS

| | | | |
|---|---|---|---|
| 10,706,386 B2 | 7/2020 | Trivelpiece et al. | |
| 11,098,455 B2 | 8/2021 | Joshi et al. | |
| 11,164,149 B1 | 11/2021 | Williams et al. | |
| 2013/0216089 A1* | 8/2013 | Chen | G06T 7/0002 |
| | | | 382/100 |
| 2017/0308834 A1* | 10/2017 | Kim | G06Q 10/06315 |
| 2019/0054937 A1* | 2/2019 | Graetz | G08G 5/0039 |
| 2019/0135315 A1 | 5/2019 | Dargy et al. | |
| 2020/0241522 A1 | 7/2020 | Selvakani et al. | |
| 2020/0349498 A1* | 11/2020 | Brooks | B61L 25/028 |
| 2020/0409929 A1* | 12/2020 | Kodavarti | G06F 16/2365 |
| 2021/0015079 A1* | 1/2021 | Gorski | G16H 50/20 |
| 2021/0142268 A1 | 5/2021 | Brooks et al. | |
| 2022/0019970 A1* | 1/2022 | Williams | B64U 10/13 |

* cited by examiner

RAILROAD OPERATIONS IMAGE DETECTION AND IDENTIFICATION SYSTEM AND METHOD THEREFOR

TECHNICAL FIELD

The present disclosure relates generally to automated asset management, and more particularly to asset detection and identification techniques and systems for automated asset inspection.

BACKGROUND

Many current operations require a substantial infrastructure. Typical infrastructure operations may include a large number of assets, of various types, that may be dispersed over large areas that may be used in operations. For example, in current railroad-related transportation systems, yards or intermodal facilities may be used to facilitate the transportation and/or storage of freight. In these examples, these intermodal facilities may be used as a hub for freight that is transported by railroad, where ground vehicles may be used to bring the freight in or out of the intermodal facilities, and where freight may be loaded onto and from railroad cars.

To accomplish support of transportation operations, these intermodal facilities may include substantial infrastructure assets such as inventory, storage containers, transportation vehicles, rail cars, trailers, tracks, warehouses, buildings, security fences, storage slots, roads, signs, etc. These assets may be used during operations, stored in the intermodal facilities during transportation, transit through the intermodal facilities, permanently attached to the intermodal facility, or may otherwise be related in some operational manner to the intermodal facility. Because these assets are operational important, in some cases operationally essential, managing these assets is extremely important. Managing assets may include inspecting the assets to determine/confirm their condition, location, quantity, etc.

Current asset management solutions include manual inspection of these assets. For example, a user may manually approach an asset to inspect it and determine/confirm its condition, location, quantity, etc. of the asset. However, given the amount of assets that may be part of operations, this manual approach may be tedious, time-consuming, and prone to mistakes. In addition, different persons with different skills may be required depending on the inspection activity, which may cause an increase in required human resources. For example, inspecting assets to determine their location in an intermodal facility may not require specialized skills, but inspecting an item to determine whether the asset needs maintenance or whether the asset is secure may require a person with some knowledge of security principles. Therefore, current asset management systems suffer from a technological problem of lacking functionality to automate asset management and inspection operations.

BRIEF SUMMARY OF THE INVENTION

The present disclosure achieves technical advantages as systems, methods, and computer-readable storage media that provide functionality for automated asset management and inspection. The present disclosure provides for a system integrated into a practical application with meaningful limitations as a system for performing automated collection of data (e.g., image data, metadata, etc.) associated with assets and for performing automated analysis of the collected data to detect, identify, and/or inspect assets appearing or represented in the collected asset data. Embodiments of the present disclosure may include an automated data collection configurator that includes functionality for configuring a mission plan and/or an asset data collector to perform the automated data collection in accordance with the mission plan. In embodiments, an automated asset data analyzer may be configured to perform the automated analysis of the collected asset data to detect (e.g., using a machine learning (ML) model), identify (e.g., using the ML model) and/or inspect (e.g., including determining a condition and/or location of the identified objects) assets appearing or represented in the collected asset data in accordance with the mission plan configured by the automated data collection configurator.

The present disclosure solves the technological problem of a lack of functionality to automate asset management and inspection operations by at least providing a novel and inventive mechanism for automating asset management and inspection operations. The technological solutions provided herein, and missing from conventional systems, are more than a mere application of a manual process to a computerized environment, but rather include functionality to implement a technical process to replace or supplement current manual solutions for asset management and inspections. In doing so, the present disclosure goes well beyond a mere application the manual process to a computer. For example, the present disclosure provides solutions that include implementing functionality to configure and instantiate automated asset data collection that may include image data, and to perform automated analysis of the collected asset image data to detect (e.g., using a machine learning (ML) model), identify (e.g., using the ML model) and/or inspect (e.g., including determining a condition and/or location of the identified objects) assets appearing or represented in the collected asset image data. Accordingly, the claims herein are necessarily rooted in computer technology as they overcome a problem arising in the realm of machine learning and image processing.

Accordingly, the present disclosure discloses concepts inextricably tied to computer technology such that the present disclosure provides the technological benefit of implementing functionality to asset management systems for automated asset data collection and automated analysis of the collected asset data. The systems and techniques of embodiments provide improved asset management systems with capabilities to, more accurately and with less lag time, automatically collect data associated with assets in an intermodal facility and automatically perform analysis of the collected asset data.

It is an object of the invention to provide a system for automated asset management and inspection. It is a further object of the invention to provide a method of automated asset management and inspection. These and other objects are provided by the present disclosure, including at least the following embodiments.

In one particular embodiment, an automated asset management system is provided. The system comprises an asset data collector configured to automatically collect asset data associated with one or more assets in an intermodal facility according to a mission plan. The system also comprises an automated data collection configurator configured to configure the mission plan based on one or more parameters and instantiate the asset data collector. In embodiments, instantiating the asset data collector causes the asset data collector to initiate automatically collecting the asset data associated with one or more assets in the intermodal facility according to the mission plan. The system also comprises an automated asset data analyzer configured to detect the one or more assets in a set of data of the asset data collected by the asset data collector. In embodiments, detecting the one or more assets in the set of data includes identifying data in which the one or more assets appear. The automated asset data analyzer is further configured to identify the one or more assets detected in the set of data, to inspect, based on the set of data in which the one or more assets are detected, the one or more assets to determine a condition of the one or more assets, and to output the condition of the one or more assets.

In another embodiment, a method of automated asset management is provided. The method includes configuring a mission plan for collecting asset data associated with one or more assets in an intermodal facility based on one or more parameters and instantiating an asset data collector to automatically collect the asset data associated with the one or more assets. In embodiments, instantiating the asset data collector causes the asset data collector to initiate automatically collecting the asset data associated with one or more assets in the intermodal facility according to the mission plan. The method also includes automatically collecting, by the asset data collector, the asset data associated with the one or more assets in the intermodal facility according to the mission plan and detecting the one or more assets in a set of data of the asset data collected by the asset data collector. In embodiments, detecting the one or more assets in the set of data includes identifying data in which the one or more assets appear. The method further includes identifying the one or more assets detected in the set of data, inspecting, based on the set of data in which the one or more assets are detected, the one or more assets to determine a condition of the one or more assets, and outputting the condition of the one or more assets.

In yet another embodiment, a computer-based tool for automated asset management is provided. The computer-based tool may include non-transitory computer readable media having stored thereon computer code which, when executed by a processor, causes a computing device to perform operations. The operations include configuring a mission plan for collecting asset data associated with one or more assets in an intermodal facility based on one or more parameters and instantiating an asset data collector to automatically collect the asset data associated with the one or more assets. In embodiments, instantiating the asset data collector causes the asset data collector to initiate automatically collecting the asset data associated with one or more assets in the intermodal facility according to the mission plan. The operations also include automatically collecting, by the asset data collector, the asset data associated with the one or more assets in the intermodal facility according to the mission plan and detecting the one or more assets in a set of data of the asset data collected by the asset data collector. In embodiments, detecting the one or more assets in the set of data includes identifying data in which the one or more assets appear. The operations further include identifying the one or more assets detected in the set of data, inspecting, based on the set of data in which the one or more assets are detected, the one or more assets to determine a condition of the one or more assets, and outputting the condition of the one or more assets.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
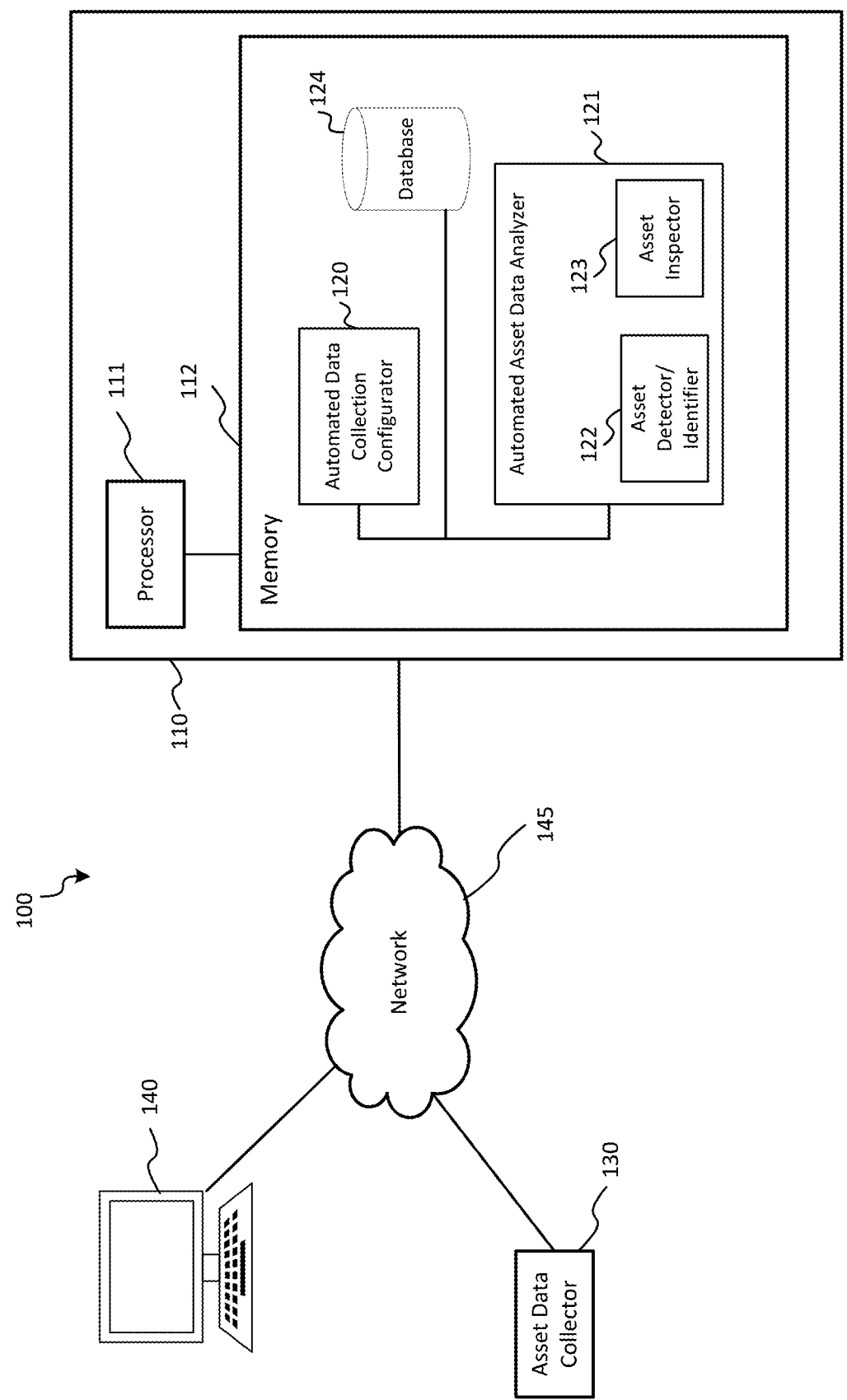
FIG. 1 is a block diagram of an exemplary system configured with capabilities and functionality for providing automated asset management and inspection in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for automated asset management and inspection. In particular embodiments, a system implemented in accordance with the present disclosure may include functionality for performing automated collection of data (e.g., image data, metadata, etc.) associated with assets and for performing automated analysis of the collected data to detect, identify, and/or inspect assets appearing or represented in the collected asset data. Embodiments of the present disclosure may include an automated data collection configurator that includes functionality for configuring a mission plan and/or an asset data collector to perform the automated data collection in accordance with the mission plan. In embodiments, an automated asset data analyzer may be configured to perform the automated analysis of the collected asset data to detect (e.g., using a machine learning (ML) model), identify (e.g., using the ML model) and/or inspect (e.g., including determining a condition and/or location of the identified objects) assets appearing or represented in the collected asset data in accordance with the mission plan configured by the automated data collection configurator.

FIG. 1 is a block diagram of an exemplary system 100 configured with capabilities and functionality for providing automated asset management and inspection in accordance with embodiments of the present disclosure. As shown in FIG. 1, system 100 may include server 110, user terminal 140, asset data collector 130, and network 145. These components, and their individual components, may cooperatively operate to provide functionality in accordance with the discussion herein. For example, in operation according to embodiments, a mission plan may be configured via the cooperative functionality of server 110 and user terminal 140. The mission plan may define one or more parameters that may configured asset data collector 130 to perform automated data collection of assets in accordance with the mission plan. Functionality of server 110 may operate to perform automated analysis of the collected asset data to detect, identify, and/or inspect assets appearing or represented in the collected asset data.

It is noted that the present discussion focuses on a particular application of asset management that involves asset management in an intermodal facility. However, it should be appreciated that the techniques disclosed herein may also be applicable to other applications of asset management. For example, the techniques disclosed herein may also be applicable in warehouses to manage retail inventory or may be applicable to manage inventory of vehicles in a vehicle lot or may be applicable to manage any number of assets in any number of environments. As such, the discussion herein with respect to assets in an intermodal facility should not be construed as limiting in any way.

Figure 2:
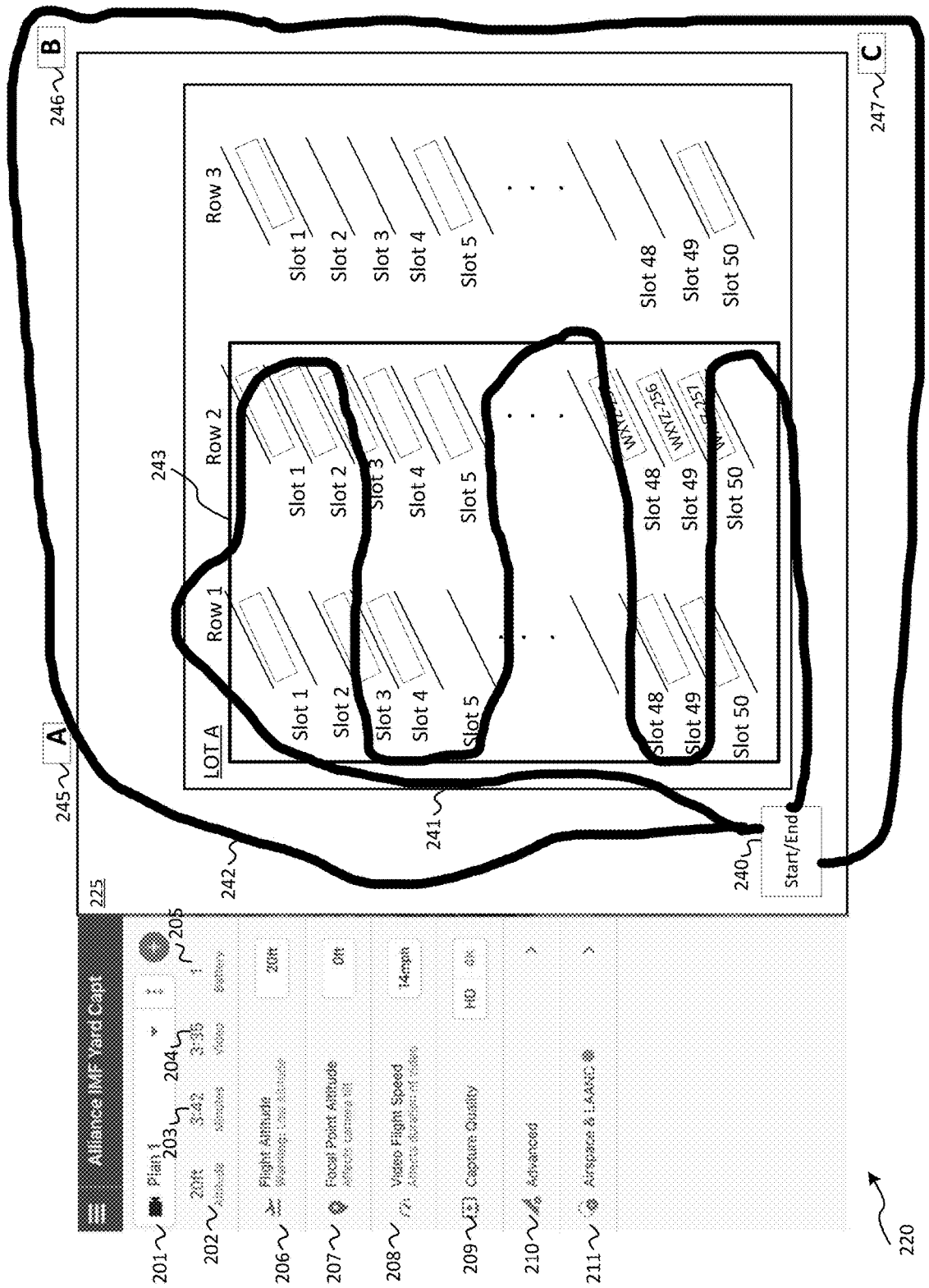
FIG. 2 is a block diagram illustrating an example of configuration operations of a system for automated asset management implemented in accordance with embodiments of the present disclosure.
Figure 3:
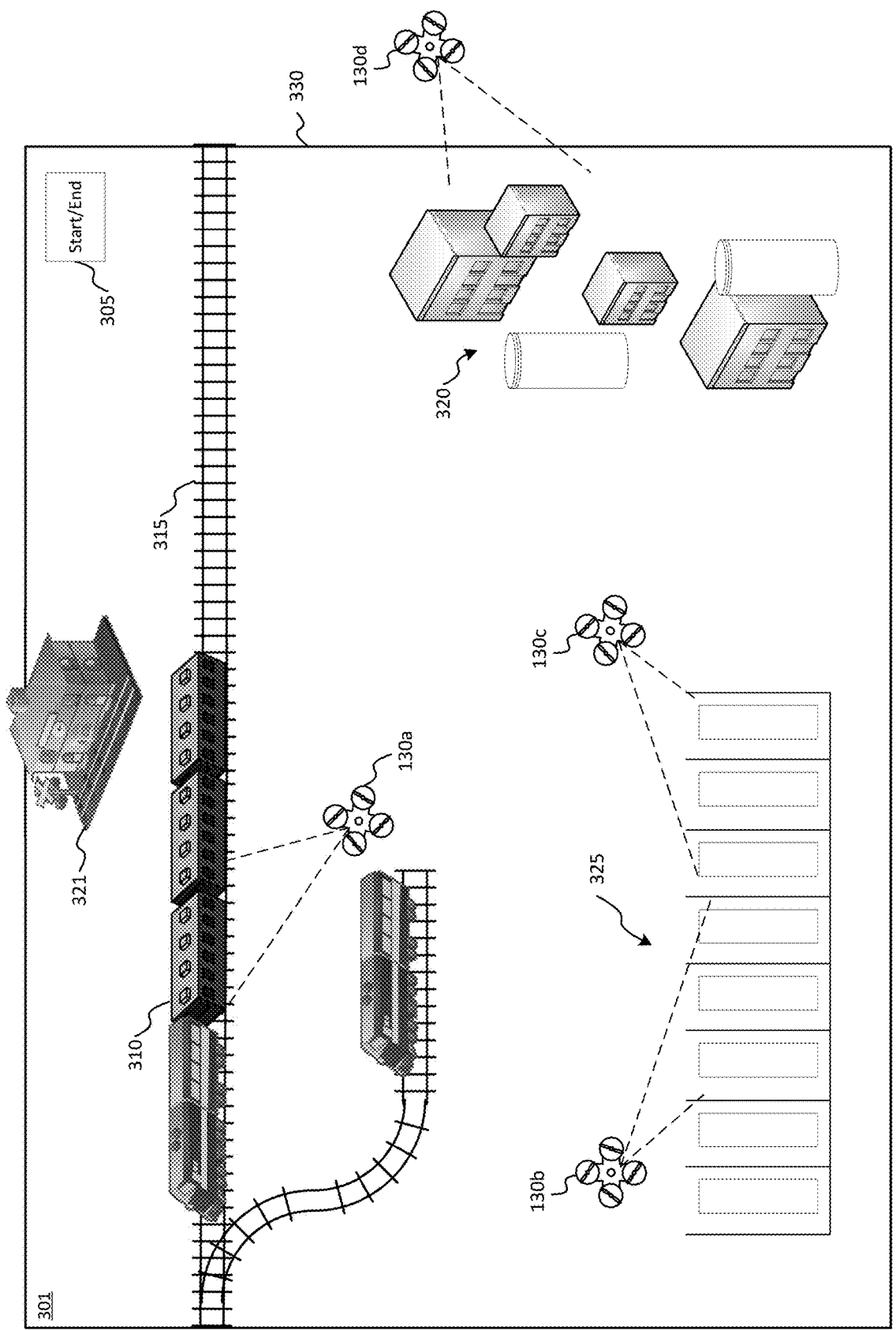
FIG. 3 is a block diagram illustrating an example of operations for automated asset management in an intermodal facility of a system implemented in accordance with embodiments of the present disclosure.

The discussion of system 100, as shown in FIG. 1, will be further based on the example illustrated in FIGS. 2 and 3. FIG. 2 is a block diagram illustrating an example of configuration operations of a system for automated asset management implemented in accordance with embodiments of the present disclosure. FIG. 3 is a block diagram illustrating an example of operations for automated asset management in an intermodal facility of a system implemented in accordance with embodiments of the present disclosure.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

User terminal 140 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user terminal 140 may be configured to provide an interface (e.g., a graphical user interface (GUI)) structured to facilitate a user interacting with system 100, e.g., via network 145, to execute and leverage the features provided by server 110. In embodiments, the user may be enabled, e.g., through the functionality of user terminal 140, to specify one or more parameters that may be used by automated data collection configurator 120 of server 110 to configure a mission plan that may be used or executed to perform automated data collection. For example, the mission plan may be used or executed by asset data collector 130 to collect asset data in accordance with the mission plan.

In some embodiments, the mission plan may include a flight route or path to be followed by asset data collector 130 to collect data associated with assets of the intermodal facility. In embodiments, the user may specify parameters that may be used to determine (e.g., by automated data collection configurator 120) the mission plan flight route. For example, a user may specify an actual path or pattern, an operational area, a set of waypoints, or any combination thereof. For example, as shown in the example illustrated in FIG. 2, GUI 220 may enable the user to specify flight pattern 241 (e.g., by drawing the pattern over a representation of at least a portion of intermodal facility 225). During automated asset data collection operations, asset data collector 130 may follow flight pattern 241, starting and ending at start/end point 240, to collect asset data in accordance with the mission plan. In some embodiments, as discussed below, flight pattern 241 may be automatically determined by system 100 (e.g., by automated data collection configurator 120) based on parameters specified for the mission plan, or by asset data collector 130, rather than, or additionally to being, drawn manually by the user.

In embodiments, GUI 220 may enable the user to specify an operational area (e.g., by drawing a box, such as box 243 shown in the example illustrated in FIG. 2, of a particular size and/or shape around the desired operational area, or by specifying a location (e.g., lot A, rows 1 and 2) encompassing the desired operational area) over the representation of at least a portion of intermodal facility 225. In embodiments, system 100 (e.g., through the functionality of automated data collection configurator 120 or the functionality of asset data collector 130) may determine the flight pattern to be followed by asset data collector 130 during automated asset data collection (e.g., flight pattern 241) based on the mission plan parameters.

In embodiments, GUI 220 may enable the user to specify a set of waypoints (e.g., waypoints 245-247, in the example illustrated in FIG. 2) that define a flight pattern to be followed by asset data collector 130 for collecting the asset data in intermodal facility 225. In these embodiments, during automated data collection, asset data collector 130 may fly from waypoint to waypoint. In some embodiments, a flight pattern (e.g., flight pattern 242) may be determined (e.g., through the functionality of automated data collection configurator 120 or the functionality of asset data collector 130) based on the set of waypoints. In these embodiments, asset data collector 130 may follow the flight pattern, starting and ending at start/end point 240, to collect asset data in accordance with the mission plan.

In embodiments, GUI 220 may enable the user to specify further parameters for the mission plan. For example, a user may specify a mission plan title 201 for identifying the mission plan. This functionality may be significant as it may allow a user to reload a previously configured mission plan, which may allow the user to reuse a mission plan without having to specify all parameters of the mission plan or may allow the user to reload the parameters of the previous mission plan and to modify a subset of the parameters without having to specify all the parameters again. GUI 220 may enable the user to specify flight altitude 206 at which asset data collector 130 is to operate when collecting the asset data. In some embodiments, GIU 220 may display a warning when the altitude selected or specified by the user is too low, too high, or is otherwise determined to be inappropriate for the mission based on one or more of the other parameters. For example, the flight pattern may specify that asset data collector 130 is to fly over power cables. System 100 (e.g., through the functionality of automated data collection configurator 120) may determine that a particular altitude is too low for such a pattern, as flying at the particular altitude may risk asset data collector 130 colliding with the power cables. In such a case, GUI 220 may present a warning to the user, or may recommend a more suitable altitude (e.g., an altitude determined to avoid the risk of collision).

In embodiments, GUI 220 may enable the user to specify focal point altitude 207, which may indicate a ground altitude at which asset data collector 130 is to focus to collect the asset data. For example, a focal point altitude of 5 feet may indicate that asset data collector 130 is to focus on a ground altitude of 5 feet when collecting asset data, in which case asset data collector 130 may tilt one or more of its sensors (e.g., a camera) so that the sensor is focused on a focus point of 5 feet. As will be appreciated, the focal point altitude may indicate a focal point for the data capture, not necessarily a single point from which data is captured. As such, the focal point does not indicate the sole point from where data is collected, but rather the point to which the data sensor is focused at. The field of view of the sensor may define the area that is captured, which may include the focal point at which the sensor is focused.

In embodiments, GUI 220 may enable the user to specify video flight speed 208, which may indicate a speed at which asset data collector 130 is to capture data. In embodiments, video flight speed 208 may be used to configure the speed at which asset data collector 130 is to fly when collecting asset data. A fast video flight speed 208 may result in a small amount of asset data capture. For example, in the case where the asset data collected is video, a fast video flight speed may result in a relatively short video captured, as the asset data collector 130 may be moving fast when capturing the video. Consequently, in this case, and depending on the video quality and frame rate of the captured video, the size of the captured video may be small. On the other hand, a slow video flight speed 208 may result in a large amount of asset data captured. For example, in the case where the asset data collected is video, a slow video flight speed may result in a relatively long video captured, as the asset data collector 130 may be moving slow when capturing the video. Consequently, in this case, and depending on the video quality and frame rate of the captured video, the size of the captured video may be large.

In embodiments, GUI 220 may enable the user to specify capture quality 209, which may indicate a quality at which asset data collector 130 is to capture the asset data. For example, where the asset data collected includes video, capture quality 209 may specify the quality of the video to be captured. It is noted that the size of the captured data may depend on capture quality 209. For example, a high quality may result in a large amount of captured data, as a high quality typically requires more captured information, whereas a lower quality may result in a relatively smaller amount of captured data. In some embodiments, GUI 220 may automatically adjust the options presented for selection for capture quality 209 depending on the type of sensor with which asset data collector 130 may be equipped. For example, asset data collector 130 may be equipped with a camera capable of capturing 4K video. In this case, the options available for selection by the user for capture quality 209 may include up to 4K quality.

In embodiments, GUI 220 may enable the user to specify advanced parameters 210. Although not shown, the advanced parameters may include a frame rate (e.g., frames per second (fps)) for the captured asset data, a type of asset data to be collected (e.g., video, still pictures, infrared data, heat data, audio data, etc.), a metadata sampling rate (e.g., a rate at which metadata associated with asset data collector 130 is to be captured), a number of pattern repetitions (e.g., a number indicating a number of times the flight pattern is to be repeated in a mission plan), a stopping condition (e.g., a condition which, if found, would cause the mission plan to terminate, and may cause asset data collector to return to the start/end point)), a type of mission (e.g., inspection mission, locating mission, surveillance mission, security mission, maintenance mission, etc.), etc. In embodiments, GUI 220 may enable the user to specify regulatory parameters 210, which may include airspace and low altitude authorization and notification capability (LAANC) parameters.

In embodiments, GUI 220 may present details of the mission plan based on the specified parameters. For example, altitude 202 may display an altitude at which asset data collector 130 is to operate during execution of the mission plan, which in may correspond to the altitude specified in flight altitude 206. Mission duration 203 may indicate a duration of the mission plan, based on the parameters of the mission plan (e.g., flight route, flight speed, flight altitude, etc.). Video duration 204 may indicate the length or size of the captured asset data, based on the parameters of the mission plan. For example, where the captured asset data includes video, video duration 204 may indicate the length of the captured video, depending on the mission duration, the flight speed, etc.). Battery indicator 205 may indicate the number of batteries to be required by asset data collector 130 to complete the mission plan, or the number of charges (e.g., the number of times the battery may need to be charged) required by asset data collector 130 to complete the mission plan.

In embodiments, user terminal 140 may be communicatively coupled to server 110 (e.g., via network 145) and the one or more parameters for the mission plan may be sent to server 110 (e.g., to automated data collection configurator) for configuring the mission plan. In some embodiments, the one or more parameters for the mission plan may be specified using terminal 140, may be stored to a mobile storage device (not shown), and may then be uploaded to server 110 from the mobile storage device. In this manner, flexibility may be provided for providing the one or more parameters to server 110 for configuring the mission plan.

In some embodiments, user terminal 140 may be configured to present (e.g., display) the results output by server 110, which may include the identification, location, and/or condition of assets in intermodal facility 225. In some embodiments, the results may be output to an external system, such as an asset management system.

With reference back to FIG. 1, asset data collector 130 may be configured to perform the automated data collection of asset data associated with assets in an intermodal facility based on the mission plan. For example, in embodiments, asset data collector 130 may include sensors (e.g., cameras, detectors, microphones, etc.) configured to capture sensor data associated with the assets. The sensor data may include still pictures, video, infrared data, heat data, etc. In embodiments, asset data collector 130 may be a vehicle upon which the sensor may be mounted. For example, the vehicle may be a ground vehicle (e.g., a car or truck), or may be an aerial vehicle (e.g., a piloted aerial vehicle, such as an onboard or remote-piloted aerial vehicle, or a UAS). Asset data collector 130 may be configured to avoid obstacles, and/or may be configured to traverse the intermodal storage facility at low speeds (e.g., speeds not exceeding ten miles per hour), or at speeds that may exceed ten miles per hour.

It is noted that, in the present disclosure, the discussion focuses on collection of image data (e.g., video) using a camera, but as will be appreciated that such a discussion is for illustrative purposes and not intended to be limiting in any way. The techniques disclosed herein apply to collection of any sensor data that may be used to detect, identify, and inspect an asset in an intermodal facility. It is further noted that although the present discussion focuses on embodiments in which asset data collector 130 includes a UAS (e.g., a UAS with a camera mounted on the UAS), the techniques disclosed herein are also applicable to embodiments in which asset data collector 130 includes a manned aerial system, or a ground vehicle. For example, in some embodiments, a ground vehicle may have a camera mounted on it, and the camera may be configured to capture image data of assets in an intermodal facility as the ground vehicle is driven (e.g., following a "flight" plan, which may set out the ground route to be followed by the ground vehicle) through the intermodal facility in accordance with the mission plan. As such, the discussion of a UAS should not be construed as limiting in any way. As used herein, a UAS may refer to an unmanned aerial vehicle, and may include an autonomous or ground controlled aircraft such as a drone, a multi-copter, a quadcopter, fixed wing aircraft, etc.

In embodiments, asset data collector 130 may be configured to receive the mission plan (e.g., the mission plan as configured by automated data collection configurator 120). For example, in embodiments, the mission plan, which may include the one or more parameters specified for the mission plan, may be uploaded to asset data collector 130 via network 145 (e.g., from automated data collection configurator 120). In some embodiments, the mission plan may be manually uploaded to asset data collector 130, such as by storing the mission plan on a mobile storage device, connecting the mobile storage device to asset data collector 130, and uploading the mission plan to asset data collector 130 from the mobile storage device.

Asset data collector 130 may be configured to execute the mission plan, in accordance with the configuration of the mission plan. For example, asset data collector 130 may execute the mission plan by traversing the intermodal facility following the configuration of the mission plan (e.g., flight patterns, flight altitude, flight speed, focal point altitude, capture quality, etc.) while collecting asset data (e.g., image data associated with the assets). The asset data may include data associated with assets in the intermodal facility, which may include assets such as inventory, storage containers, transportation vehicles, rail cars, trailers, tracks, warehouses, buildings, security fences, storage slots, roads, signs, etc. For example, as shown in FIG. 3, intermodal facility 301 may include various assets of various types, such as train cars 310, tracks 315, building 320, containers 325, security fence 330, among many other assets.

In embodiments, asset data collector 130 may be configured to capture or record metadata associated with asset data collector 130 at intervals. The metadata may include a location of asset data collector 130, an orientation of one or more sensors of asset data collector 130 (e.g., an orientation of a camera of asset data collector 130 and/or an orientation of a gimbal upon which the camera is mounted), an altitude of asset data collector 130, a speed of asset data collector 130, a timestamp, etc., at the moment the metadata is recorded.

In embodiments, asset data collector 130 may include onboard memory (not shown) configured for storing the collected asset data, which may include image data associated with the assets in the intermodal facility and/or the metadata associated with asset data collector 130. In these embodiments, the collected asset data may be stored on the onboard memory for subsequent offloading to server 110.

For example, in some embodiments, the collected asset data may be offloaded from asset data collector 130 to a mobile storage device (not shown). The mobile storage device may then be connected to server 110 and the collected asset data may be uploaded to server 110 from the mobile storage device. In some embodiments, asset data collector 130 may be communicatively coupled to server 110 (e.g., via network 145) and the collected asset data may be offloaded to server 110 via network 145. In some embodiments, asset data collector 130 may be configured to live-stream (e.g., via network 145 or another network not shown) the collected asset data to server 110. In these embodiments, asset data collector 130 may transmit, send, or upload the asset data in real-time, or near-real-time, to server 110 as the asset data is collected. The live-stream functionality of asset data collector 130 may be in addition or in the alternative to storing the captured image data on the onboard memory of asset data collector 130 for subsequent offloading to sever 110.

In some embodiments, asset data collector 130 may be configured to operate in cooperation with other asset data collectors. In these embodiments, system 100 may include a plurality of asset data collectors, and the plurality of asset data collectors may operate in various modes of cooperation. In these embodiments, a mission plan for an asset data collector may be configured based on a mission plan configured for another asset data collector. In these cases, the mission plans for the various asset data collectors take into account the mission plans of the asset data collectors. For example, as shown in FIG. 3, asset data collectors 130a-130d may operate in intermodal facility 301 to provide automated asset management functionality in accordance with embodiments of the present disclosure. In the example illustrated in FIG. 3, asset data collectors 130a-130d may operate in non-redundancy mode, in which case each asset data collector may be configured with a mission plan to operate individually to collect asset data in an individual capacity. For example, asset data collector 130a may be configured with a mission plan that includes a maintenance inspection mission to inspect rail cars 310 and track 315. In this case, asset data collector 130a may perform automated data collection of data associated with rail cars 310 and track 315, which may be processed by server 110 to perform automated analysis of the asset data. In this case, asset data collector 130a may perform the automated data collection without collaboration from asset data collectors 130b-130d. In this example, asset data collector 130b may be configured with a mission plan that includes a location mission to determine/verify the location of containers 325. In this case, asset data collector 130b may perform automated data collection of data associated with containers 325, which may be processed by server 110 to perform automated analysis of the asset data. In this case, asset data collector 130b may perform the automated data collection without collaboration from asset data collectors 130a, 130c, or 130d. Further, in this example, asset data collector 130d may be configured with a mission plan that includes a security mission to provide surveillance and security of the perimeter are of intermodal facility 301. In this case, asset data collector 130d may perform automated data collection of data associated with fence 330, which may surround intermodal facility 301, and of buildings 320 and 321 which may be proximate to fence 330. The asset data collected by asset data collector 130d may be processed by server 110 to perform automated analysis of the asset data. In this case, asset data collector 130d may perform the automated data collection without collaboration from asset data collectors 130a-130c.

In some embodiments, asset data collectors may operate in redundancy mode. In these embodiments, some asset data collectors may be used to double-check results associated with other asset data collectors. For example, asset data collectors 130b and 130c may be configured with mission plans for inspection of containers 325. In this redundancy mode case, asset data collectors 130b and 130c may operate to collect data associated with the same containers, namely container 325. The results associated with the data collected by one of asset data collectors 130b and 130c may be used to verify, confirm, or otherwise validate the results associated with the asset data collected by the other one of asset data collectors 130b and 130c, as the results are expected to be similar. In some embodiments, the redundancy mode may include assigning some asset data collectors to be on stand-by to replace other asset data collectors when problems occur in order to ensure continuity of operations.

As alluded to above, in some embodiments, different asset data collectors may be assigned to different types of missions. The types of missions may include maintenance missions, inspection missions, security missions, etc. For example, a mission plan may configure an asset data collector for a maintenance mission. In this case, the asset data collector may collect asset data to be analyzed in order to determine whether assets may require maintenance, to determine whether maintenance performed on an asset was performed properly, etc. In another example, a mission plan may configure an asset data collector for a security mission. In this case, the asset data collector may collect asset data to be analyzed in order to determine a security posture of assets, to perform surveillance to prevent security issues (e.g., trespassing, burglaries, unauthorized entries, etc.), to ensure that assets have not been misappropriated, mishandled, or otherwise been interfered with, etc. In still another example, a mission plan may configure an asset data collector for an inspection mission. In this case, the asset data collector may collect asset data to be analyzed in order to inspect assets to determine one or more of a condition or location of the assets.

With reference back to FIG. 1, server 110, asset data locator 130, and user terminal 140 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Server 110 may be configured to facilitate configuration of the automated data collection and to perform automated analysis of the asset data collected in accordance with embodiments of the present disclosure. In embodiments, functionality of server 110 to facilitate configuration of the automated data collection may include functionality for generating a configuration of a mission plan to be executed by an asset data collector to perform the automated data collection. In embodiments, functionality of server 110 to perform the automated analysis of the asset data may include functionality for detecting assets in the asset data, for identifying the assets detected based on the asset data, for inspecting the assets based on the asset data, and for generating an output including results of the automated analysis, in accordance with embodiments of the present disclosure.

The functionality of server 110 may be provided by the cooperative operation of the various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, database 124, automated data collection configurator 120, and automated asset data analyzer 121. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 124 for storing various information related to operations of system 100. For example, database 124 may store ML models, mathematical models, rules models, and/or other models that may be used by components of server 110 to analyze and process asset data to detect assets in the asset data, to identify the detected assets based on the asset data, and to inspect the detected assets based on the asset data in accordance with embodiments of the present disclosure. In embodiments, database 124 may provide storage of the asset data collected by asset data collect 130. For example, the asset data collected asset data collector 130 may be ingested by server 110 and may be stored in database 124 for further analysis (e.g., analysis by automated asset data analyzer 121). In embodiments, database 124 may provide storage of configuration data. For example, database 124 may provide storage for the one or more parameters discussed above and/or configuration of mission plans generated (e.g., by automated data collection configurator 120) for automated data collection by asset data collect 130 based on the one or more parameters, (e.g., including flight route, flight pattern, flight range, flight altitude, flight speed, video capturing speed, focal point altitude, capture video quality, type of image data to be collected, etc.). Database 124 is illustrated as integrated into memory 112, but in some embodiments, database 124 may be provided as a separate storage module or may be provided as a cloud-based storage module. Additionally, or alternatively, database 124 may be a single database, or may be a distributed database implemented over a plurality of database modules.

Automated data collection configurator 120 may be configured to facilitate automated data collection by providing functionality to configure a mission plan that may be executed by asset data collector 130 based on one or more parameters and/or to instantiate (e.g., launch or cause to be launched) at least one asset data collector for execution of a mission. For example, the one or more parameters may be specified (e.g., by a user via a GUI or in a file uploaded to server 110) and automated data collection configurator 120 may compile, structure, and/or process the one or more parameters to generate a mission plan to be executed by asset data collector 130. In embodiments, the mission plan includes configuration that asset data collector 130 may use to execute the mission plan, as described in more detail above.

In embodiments, the mission plan for asset data collector 130 may include operational parameters that asset data collector 130 may follow during execution of the mission plan. In some embodiments, automated data collection configurator 120 may generate the operational parameters based on the parameters specified for the mission. For example, a mission plan may include a flight pattern, a speed, an altitude, etc. In embodiments, the operational parameters generated by automated data collection configurator 120 may be based on the type of mission for which the mission plan is generated. For example, different types of missions may result in different operational parameters. As shown in FIG. 2, for example, automated data collection configurator 120 may generate pattern 241 and a first altitude, which may be a low altitude, for an inspection mission. In this case, pattern 241 and the first altitude may be especially suited for an inspection mission because the pattern is a generally zigzag pattern and the altitude is a low altitude, which may allow asset data collector to capture image data of the front and back sides of the assets (e.g., containers) to be inspected. On the other hand, automated data collection configurator 120 may generate pattern 242 and a second altitude, which may be a higher altitude than the first altitude, for a security mission. In this case, pattern 242 and the second higher altitude may be especially suited for a security mission because the pattern is a generally linear pattern and the altitude is a high altitude, which may be sufficient to collect data that may be used to make security determinations with respect to the assets.

In some embodiments, automated data collection configurator 120 may determine that a mission may require a plurality of asset data collectors. In these embodiments, automated data collection configurator 120 may generate more than one mission plans, where each mission plan may configure one asset data collector or may generate one mission plan that is common to the plurality of asset data collectors. In each case, automated data collection configurator 120 may generate the mission plan or mission plans based on one or more parameters associated with the mission.

In some embodiments, automated data collection configurator 120, in cooperative operation with automated asset data analyzer 121, may be configured to leverage the live-streaming functionality of asset data collector 130 to provide functionality to dynamically determine and/or modify a mission plan based on operational conditions. For example, asset data may be collected by asset data collector 130 and may be live-streamed, in near real time, to server 110 where automated asset data analyzer 121 may analyze the collected asset data and may make determinations as to operational conditions, such as condition of the assets, condition of the environment, security conditions, maintenance conditions, etc. The results of the analysis by automated asset data analyzer 121 may be provided to automated data collection configurator 120, which may determine that the mission plan with which asset data collector 130 is currently configured is no longer optimal for the mission based on the operational conditions. In this case, automated data collection configurator 120 may determine modifications to the mission plan that may optimize the mission plan based on the operational conditions. The modified mission plan may be transmitted to asset data collector 130, which may then continue the mission in accordance with the modified mission plan. For example, during execution of a mission, automated asset data analyzer 121 may determine that data collected from a particular area may not have been captured completely, and there may be some missing data that was expected. In this case, data collection configurator 120 may generate a modified mission plan that includes instructing asset data collector 130, or may instruct asset data collector 130 directly, to fly over the area from which asset data is missing in order to ensure that the asset data for the area is collected. In another example, automated asset data analyzer 121 may determine an anomaly in a set of collected asset data. Automated data collection configurator 120 may determine that a closer look is warranted and may direct asset data collector 130 to fly over the area where the anomaly was encountered to collect further data, and in some cases the modified mission plan may include an increase in capture quality, a slower video flight speed to ensure that asset data is collected fully, an increase of the capture frame rate, a change in altitude, etc.

In some embodiments, asset data collector 130 may be configured to modify the mission plan. For example, in some embodiments, the flight pattern of a mission plan may be modified during mission plan execution. Asset data collector 130 may be configured with obstacle avoidance functionality. In this case, during execution of a mission plan, asset data collector 130 may determine that following the flight pattern may cause a collision with an object. In this case, asset data collector 130 may modify the flight pattern to avoid the collision or may notify automated data collection configurator 120 about the potential collision, in which case automated data collection configurator 120 may generate a modified mission plan.

Automated asset data analyzer 121 may be configured to perform automated analysis of the collected asset data to detect, identify, and/or inspect assets appearing or represented in the asset data collected in accordance with the mission plan configured by automated data collection configurator 120. In embodiments, the functionality of automated data analysis to detect, identify, and/or inspect assets appearing or represented in the asset data collected may include application of ML, modules and sets of rules to the collected asset data. Techniques for automated data analysis to detect, identify, and/or inspect objects appearing in captured image data are disclosed in co-pending and co-owned U.S. patent application Ser. No. 17/822,999, filed Aug. 29, 2022, and entitled, "DRONE BASED AUTOMATED YARD CHECK," the disclosure of which is incorporated by reference herein in its entirety for all purposes. In embodiments, automated asset data analyzer 121 may include asset detector/identifier 122 and asset inspector 123, which may cooperatively operate to provide the functionality of automated asset data analyzer 121 to perform the automated analysis of the collected asset data.

In embodiments, asset detector/identifier 122 may be configured to analyze the collected asset data to detect and identify assets appearing or represented in the asset data. For example, (and with additional reference to FIG. 3), the collected asset data may include image data associated with assets in intermodal facility 301. The image data may include a video, or a series of pictures, of assets in intermodal facility 301. For example, the collected asset data may include a video of fence 330 and of buildings 320 and 321 captured by asset data collector 130d in accordance with a mission plan. In another example, the collected asset data may include a video of containers 325 captured by asset data collector 130b and/or 130c in accordance with a mission plan or may include a video of train cars 310 and/or track 315 captured by asset data collector 130a in accordance with a mission plan. In these examples, the collected asset data may include video data of assets in intermodal facility 301.

In embodiments, asset detector/identifier 122 may be configured to analyze the collected asset data frame by frame using an ML/computer vision (CV) model. The ML/CV model may be trained to detect and identify assets present in the asset data (e.g., assets appearing in image data). In these embodiments, asset detector/identifier 122 may apply the ML/CV model to the video data, frame by frame, to detect and identify assets appearing in the different frames. For example, the ML/CV model may detect assets that appear in frames and may determine a set of frames in which at least one asset appears. In this manner, asset detector/identifier 122 may detect assets in the asset data.

In embodiments, asset detector/identifier 122 may apply the ML/CV model to the set of frames in which at least one asset appears to identify the assets appearing in the frames. For example, the ML/CV model may be applied to each one of the frames to identify the assets appearing in each of the frame. In embodiments, an identification is assigned to each asset appearing in each frame, which may allow system 100 to track particular assets from frame to frame.

In embodiments, asset inspector 123 may be configured to inspect each asset detected in each frame of the set of frames. In embodiments, inspecting an asset may include determining a condition of the asset. Conditions of an asset may include a physical condition of the asset, and may include a location of the asset, any damage to the asset, whether the asset is open or closed, whether the asset is positioned correctly, whether the asset is empty, whether the asset's appearance is as expected, whether the asset is complete or is missing parts thereof, whether the asset has been breached, whether the asset includes unexpected additions, and/or any other condition that may be determined to be unexpected or that may be determined to warrant further inspection.

In embodiments, the condition of an asset may be relevant within the context of the mission type under which the asset data associated with the asset is collected. For example, a security mission may result in asset data in which a fence, such as fence 330, may appear. In this example, the condition of fence 330 may be determined by asset inspector 123 to be breached, which may cause an agent to be dispatched to investigate further or to take remedial actions. On the other hand, the condition of fence 330 may be determined by asset inspector 123 to be normal, in which case no further action may be taken. In another example, an inspection mission to determine or verify the location of assets (e.g., containers 325) may result in asset data in which containers 325 may appear. In this example, the condition of containers 325 may include the location of each of containers 325. As noted elsewhere herein, techniques for determining a location of objects based on captured image data are disclosed in co-pending and co-owned U.S. patent application Ser. No. 17/822,999 filed Aug. 29, 2022, and entitled, "DRONE BASED AUTOMATED YARD CHECK," the disclosure of which is incorporated by reference herein in its entirety for all purposes. In still another example, a maintenance mission to determine whether maintenance is required for an asset, such as track 315, may result in asset data in which track 315 may appear. In this example, the condition of track 315 determined by asset inspector 123 may include whether maintenance is required or not on track 315, which may be determined by the physical condition of track 315 (e.g., whether there is any damage or potential for damage).

In some embodiments, the results of the analysis by automated asset data analyzer 121 may be provided as an output, such as to user terminal 140 and/or to an external system, such as an asset management system.

Figure 4:
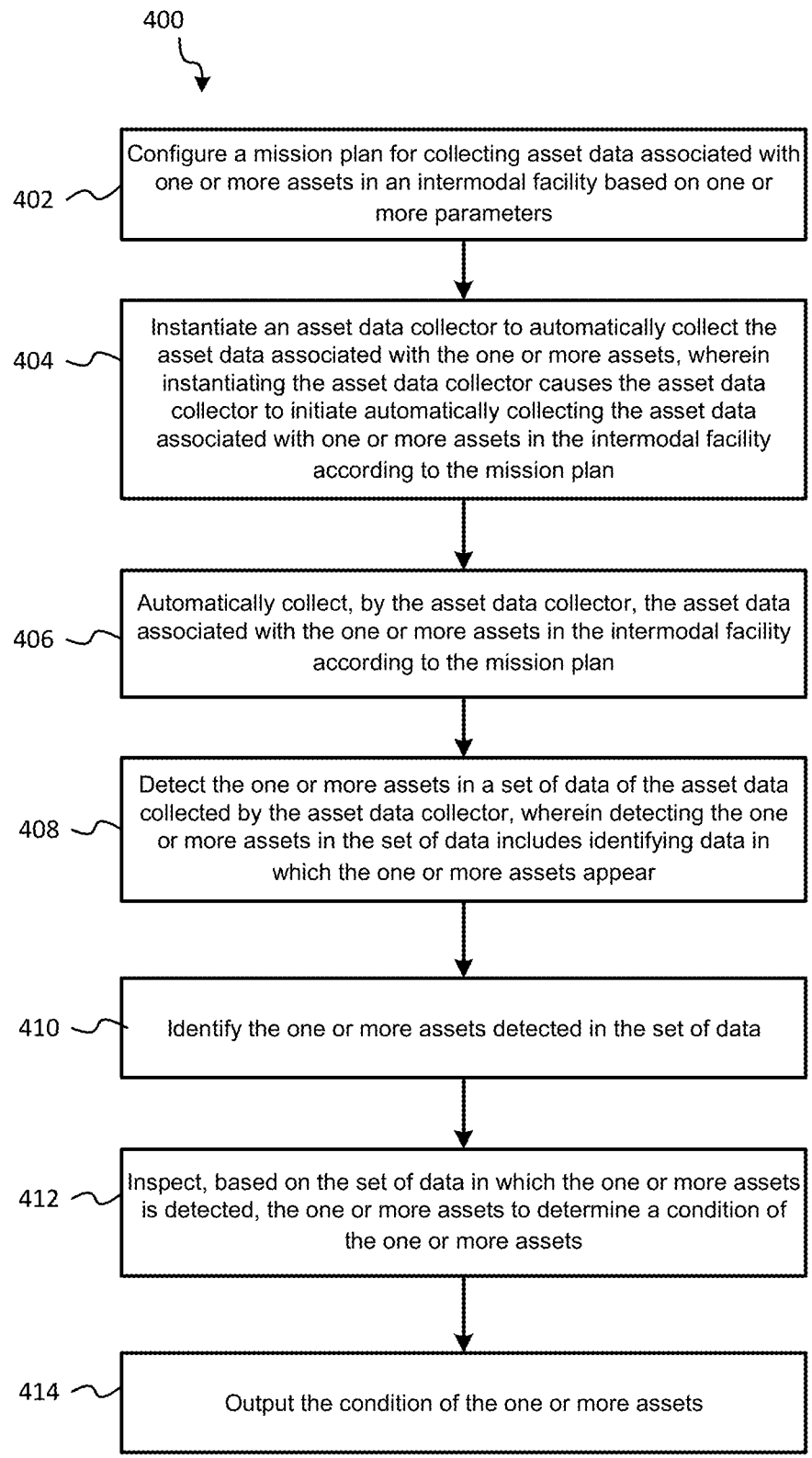
FIG. 4 shows a high-level flow diagram of operation of a system configured in accordance with embodiments of the present disclosure for providing automated asset management.

FIG. 4 shows a high-level flow diagram 400 of operation of a system configured in accordance with embodiments of the present disclosure for providing automated asset management. For example, the functions illustrated in the example blocks shown in FIG. 4 may be performed by system 100 of FIG. 1 according to embodiments herein. In embodiments, the operations of the method 400 may be stored as instructions that, when executed by one or more processors, cause the one or more processors to perform the operations of the method 400.

At block 402, a mission plan for collecting asset data associated with one or more assets in an intermodal facility is configured based on one or more parameters. In some embodiments, the collection of asset data associated with one or more assets in an intermodal facility may be performed by an asset data collector (e.g., asset data collector 130 in FIG. 1). In embodiments, functionality of an automated data collection configurator (e.g., automated data collection configurator 120) may be used to configure mission plan for collecting asset data associated with one or more assets in an intermodal facility based on one or more parameters. In embodiments, the automated data collection configurator may perform operations to configure mission plan for collecting asset data associated with one or more assets in an intermodal facility based on one or more parameters according to operations and functionality as described above with reference to automated data collection configurator 120 and as illustrated in FIGS. 1-3.

At block 404, an asset data collector (e.g., asset data collector 130) may be instantiated to automatically collect the asset data associated with the one or more assets. In embodiments, instantiating the asset data collector causes the asset data collector to initiate automatically collecting the asset data associated with one or more assets in the intermodal facility according to the mission plan. In embodiments, functionality of an automated data collection configurator (e.g., automated data collection configurator 120) may be used to instantiate an asset data collector to automatically collect the asset data associated with the one or more assets. In embodiments, the automated data collection configurator may perform operations to instantiate an asset data collector to automatically collect the asset data associated with the one or more assets according to operations and functionality as described above with reference to automated data collection configurator 120 and as illustrated in FIGS. 1-3.

At block 406, asset data associated with the one or more assets in the intermodal facility is automatically collected according to the mission plan. In embodiments, functionality of an asset data collector (e.g., asset data collector 130) may be used to automatically collect the asset data associated with the one or more assets in the intermodal facility according to the mission plan. In embodiments, the asset data collector may perform operations to automatically collect the asset data associated with the one or more assets in the intermodal facility according to the mission plan according to operations and functionality as described above with reference to asset data collector 130 and as illustrated in FIGS. 1-3.

At block 408, the one or more assets are detected in a set of data of the asset data collected by the asset data collector. In embodiments, detecting the one or more assets in the set of data includes identifying data in which the one or more assets appear. In embodiments, functionality of an asset detector/identifier (e.g., asset detector/identifier 122) may be used to detect the one or more assets in a set of data of the asset data collected by the asset data collector. In embodiments, the asset detector/identifier may perform operations to detect the one or more assets in a set of data of the asset data collected by the asset data collector according to operations and functionality as described above with reference to asset detector/identifier 122 and as illustrated in FIGS. 1-3.

At block 410, the one or more assets detected in the set of data are identified. In embodiments, functionality of an asset detector/identifier (e.g., asset detector/identifier 122) may be used to identify the one or more assets detected in the set of data. In embodiments, the asset detector/identifier may perform operations to identify the one or more assets detected in the set of data according to operations and functionality as described above with reference to asset detector/identifier 122 and as illustrated in FIGS. 1-3.

At block 412, the one or more assets are inspected, based on the set of data in which the one or more assets are detected, to determine a condition of the one or more assets. In embodiments, functionality of an asset inspector (e.g., asset inspector 123) may be used to inspect, based on the set of data in which the one or more assets are detected, the one or more assets to determine a condition of the one or more assets. In embodiments, the asset inspector may perform operations to inspect, based on the set of data in which the one or more assets are detected, the one or more assets to determine a condition of the one or more assets according to operations and functionality as described above with reference to asset inspector 123 and as illustrated in FIGS. 1-3.

At block 414, the condition of the one or more assets is output. In embodiments, functionality of an automated asset data analyzer (e.g., automated asset data analyzer 121) may be used to output the condition of the one or more assets. In embodiments, the automated asset data analyzer may perform operations to output the condition of the one or more assets according to operations and functionality as described above with reference to automated asset data analyzer 121 and as illustrated in FIGS. 1-3.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. An automated asset management system, comprising:
an asset data collector configured to automatically collect asset data associated with one or more assets in an intermodal facility according to a mission plan;
an automated data collection configurator configured to:
  configure the mission plan based on following parameters:
    a type of mission of the mission plan:
    a flight route defined by one or more of a flight pattern, an operational area, and a set of waypoints;
    a title for the mission plan;
    a flight at which the asset data collector is to operate when automatically collecting the asset data;
    a focal point altitude which indicates a ground altitude at which the asset data collector is to focus when automatically collecting the asset data;
    a video flight speed which indicates a speed at which the asset data collector is to operate when automatically collecting the asset data;
    a capture quality at which the asset data collector is to capture the asset data;
    one or more advanced parameters, wherein the one or more advanced parameters include one or more of a frame rate for collecting the asset data, a type for the asset data to be automatically collected by the asset data collector, a metadata sampling rate for collecting metadata associate with the asset data, a number of pattern repetitions indicating a number of times a flight pattern associated with the mission plan is to be repeated, a stopping condition indicating a condition which, when determined to be present, causes the mission plan to terminate, and a mission type for the mission plan; and
    one or more regulatory parameters, wherein the regulatory parameters include one or more of an indication of an airspace within which the mission plan is to operate, and a low altitude and notification capability indication; and
  instantiate the asset data collector, wherein instantiating the asset data collector causes the asset data collector to initiate automatically collecting the asset data associated with one or more assets in the intermodal facility according to the mission plan; and
an automated asset data analyzer configured to:
  detect the one or more assets in a set of data of the asset data collected by the asset data collector, wherein detecting the one or more assets in the set of data includes:
    analyzing, frame by frame, a plurality of frames of the set of data of the asset data collected by the asset data collector; and
    identifying frames, in the plurality of frames, in which the one or more assets appear;
  identify the one or more assets detected in the set of data, wherein identifying the one or more assets includes assigning a respective identification to each of the one or more assets, the respective identification configured to facilitate tracking a respective asset from frame to frame of the frames in which the respective asset appears;
  inspect, based on the set of data in which the one or more assets are detected, the one or more assets to determine a condition of the one or more assets; and
  output the condition of the one or more assets.

2. The system of claim 1, wherein the type of mission includes one or more of:
a maintenance mission;
an inspection mission; and
a security mission.

3. The system of claim 1, wherein the flight route of the mission plan is based on the type of mission, and wherein a first flight route for a first mission of a first type is different than a second flight route for a second mission of a second type.

4. The system of claim 1, wherein the configuration of the automated asset data analyzer to detect the one or more assets in the set of data, to identify the one or more assets, and to determine the condition of the one or more assets includes configuration of the automated asset data analyzer to:
apply a machine learning (ML) model to the asset data configured to one or more of detect the one or more assets in the set of data and identify the one or more assets detected in the set of data.

5. The system of claim 1, wherein the condition of the one or more assets includes one or more of:
a physical condition of the one or more assets;
a location of the one or more assets;
a damage to the one or more assets;
whether the one or more assets are open or closed;
a position of the one or more assets;
whether the one or more assets are empty or occupied;
an appearance of the one or more assets with respect to an expected appearance;
an asset condition determined to be unexpected or warranting further inspection.

6. The system of claim 1, wherein the asset data collector includes an unmanned aerial system (UAS).

7. The system of claim 6, wherein the asset data includes image data associated with the one or more assets, and wherein the UAS includes a camera for capturing the image data associated with the one or more assets.

8. The system of claim 1, wherein the asset data collector includes a plurality of data collection vehicles, and wherein the plurality of data collection vehicles automatically collects the asset data associated with the one or more assets in one of:
a redundancy mode; and
a non-redundancy mode.

9. The system of claim 8, wherein at least one data collection vehicle of the plurality of data collection vehicles operates in standby to replace another data collection vehicle of the plurality of data collection vehicles in automatically collecting the asset data when the another data collection vehicle is unable to continue automatically collecting the asset data.

10. A method of automated asset management, comprising:
configuring a mission plan for collecting asset data associated with one or more assets in an intermodal facility based on following parameters;
a type of mission of the mission plan;
a flight route defined by one or more of a flight pattern, an operational area, and a set of waypoints:
a title for the mission plan;
a flight at which the asset data collector is to operate when automatically collecting the asset data;
a focal point altitude which indicates a ground altitude at which the asset data collector is to focus when automatically collecting the asset data;
a video flight speed which indicates a speed at which the asset data collector is to operate when automatically collecting the asset data:
a capture quality at which the asset data collector is to capture the asset data;
one or more advanced parameters, wherein the one or more advanced parameters include one or more of a frame rate for collecting the asset data, a type for the asset data to be automatically collected by the asset data collector, a metadata sampling rate for collecting metadata associate with the asset data, a number of pattern repetitions indicating a number of times a flight pattern associated with the mission plan is to be repeated, a stopping condition indicating a condition which, when determined to be present, causes the mission plan to terminate, and a mission type for the mission plan; and
one or more regulatory parameters, wherein the regulatory parameters include one or more of an indication of an airspace within which the mission plan is to operate, and a low altitude and notification capability indication;
instantiating an asset data collector to automatically collect the asset data associated with the one or more assets, wherein instantiating the asset data collector causes the asset data collector to initiate automatically collecting the asset data associated with one or more assets in the intermodal facility according to the mission plan;
automatically collecting, by the asset data collector, the asset data associated with the one or more assets in the intermodal facility according to the mission plan;
detecting the one or more assets in a set of data of the asset data collected by the asset data collector, wherein detecting the one or more assets in the set of data includes:
analyzing, frame by frame, a plurality of frames of the set of data of the asset data collected by the asset data collector; and
identifying frames, in the plurality of frames, in which the one or more assets appear;
identifying the one or more assets detected in the set of data, wherein identifying the one or more assets includes assigning a respective identification to each of the one or more assets, the respective identification configured to facilitate tracking a respective asset from frame to frame of the frames in which the respective asset appears;
inspecting, based on the set of data in which the one or more assets are detected, the one or more assets to determine a condition of the one or more assets; and
outputting the condition of the one or more assets.

11. The method of claim 10, wherein the type of mission includes one or more of:
a maintenance mission;
an inspection mission; and
a security mission.

12. The method of claim 10, wherein the flight route of the mission plan is based on the type of mission, and wherein a first flight route for a first mission of a first type is different than a second flight route for a second mission of a second type.

13. The method of claim 10, wherein one or more of detecting the one or more assets in the set of data and identifying the one or more assets includes:
applying a machine learning (ML) model to the asset data configured to one or more of detect the one or more assets in the set of data and identify the one or more assets detected in the set of data.

14. The system of claim 10, wherein the condition of the one or more assets includes one or more of:
   a physical condition of the one or more assets;
   a location of the one or more assets;
   a damage to the one or more assets;
   whether the one or more assets are open or closed;
   a position of the one or more assets;
   whether the one or more assets are empty or occupied;
   an appearance of the one or more assets with respect to an expected appearance;
   an asset condition determined to be unexpected or warranting further inspection.

15. The system of claim 10, wherein the asset data collector includes an unmanned aerial system (UAS).

16. The system of claim 6, wherein the asset data includes image data associated with the one or more assets, and wherein the UAS includes a camera for capturing the image data associated with the one or more assets.

17. The system of claim 1, wherein the asset data collector includes a plurality of data collection vehicles, and wherein the plurality of data collection vehicles automatically collects the asset data associated with the one or more assets in one of:
   a redundancy mode; and
   a non-redundancy mode.

18. A computer-based tool for automated asset management, the computer-based tool including non-transitory computer readable media having stored thereon computer code which, when executed by a processor, causes a computing device to perform operations comprising:
   configuring a mission plan for collecting asset data associated with one or more assets in an intermodal facility based on following parameters:
      a type of mission of the mission plan;
      a flight route defined by one or more of a flight pattern, an operational area, and a set of waypoints:
      a title for the mission plan;
      a flight at which the asset data collector is to operate when automatically collecting the asset data:
      a focal point altitude which indicates a ground altitude at which the asset data collector is to focus when automatically collecting the asset data;
      a video flight speed which indicates a speed at which the asset data collector is to operate when automatically collecting the asset data:
      a capture quality at which the asset data collector is to capture the asset data;
      one or more advanced parameters, wherein the one or more advanced parameters include one or more of a frame rate for collecting the asset data, a type for the asset data to be automatically collected by the asset data collector, a metadata sampling rate for collecting metadata associate with the asset data, a number of pattern repetitions indicating a number of times a flight pattern associated with the mission plan is to be repeated, a stopping condition indicating a condition which, when determined to be present, causes the mission plan to terminate, and a mission type for the mission plan; and
      one or more regulatory parameters, wherein the regulatory parameters include one or more of an indication of an airspace within which the mission plan is to operate, and a low altitude and notification capability indication;
   instantiating an asset data collector to automatically collect the asset data associated with the one or more assets, wherein instantiating the asset data collector causes the asset data collector to initiate automatically collecting the asset data associated with one or more assets in the intermodal facility according to the mission plan;
   automatically collecting, by the asset data collector, the asset data associated with the one or more assets in the intermodal facility according to the mission plan;
   detecting the one or more assets in a set of data of the asset data collected by the asset data collector, wherein detecting the one or more assets in the set of data includes:
      analyzing, frame by frame, a plurality of frames of the set of data of the asset data collected by the asset data collector; and
      identifying frames, in the plurality of frames, in which the one or more assets appear;
   identifying the one or more assets detected in the set of data, wherein identifying the one or more assets includes assigning a respective identification to each of the one or more assets, the respective identification configured to facilitate tracking a respective asset from frame to frame of the frames in which the respective asset appears;
   inspecting, based on the set of data in which the one or more assets are detected, the one or more assets to determine a condition of the one or more assets; and
   outputting the condition of the one or more assets.

* * * * *